N. S. & M. S. NIELSEN.
AUTOMATIC SHOCKER.
APPLICATION FILED JAN. 31, 1913.

1,185,126.

Patented May 30, 1916.
6 SHEETS—SHEET 2.

Witnesses

Inventors
N. S. Nielsen
M. S. Nielsen
By Chandler & Chandler
Attorneys

UNITED STATES PATENT OFFICE.

NELS S. NIELSEN AND MAGNER S. NIELSEN, OF MINDEN, NEBRASKA.

AUTOMATIC SHOCKER.

1,185,126.  Specification of Letters Patent.  Patented May 30, 1916.

Application filed January 31, 1913. Serial No. 745,477.

*To all whom it may concern:*

Be it known that we, NELS S. NIELSEN and MAGNER S. NIELSEN, citizens of the United States, residing at Minden, in the county of Kearney, State of Nebraska, have invented certain new and useful Improvements in Automatic Shockers; and we do hereby declare the following to be a full, clear, and exact description of the invention, such as will enable others skilled in the art to which it appertains to make and use the same.

This invention relates to certain novel and useful improvements in an automatic shocker adapted to be attached to and employed in connection with any well known type of binder, such for instance, as the Deering binder.

In carrying out our invention it is our purpose to provide a machine of the class described which is to be attached to and drawn over the field with the binder. As the bundles of grain leave the binder they are received by a traveling conveyer and deposited in a bundle carrier by which they are transferred to an adjacent shock forming cradle. After the cradle has been loaded with a sufficient number of bundles to form a shock it is operated to drop or dump such shock upon the ground.

Furthermore, we aim to provide an automatic shocking machine wherein the traveling conveyer is thrown out of operation when the bundle carrier is transferring its contents to the shock cradle, such bundle carrier in turn remaining stationary or inactive when the cradle is actuated to dump the shock.

Another object of the invention is the provision of a shock forming machine for use in connection with a binder wherein all of the operating parts are driven by a simple arrangement of mechanism which may be readily controlled and operated to perform the various functions for which the machine is designed.

With the above recited objects and others of a similar nature in view, our invention consists in the construction, combination and arrangement of parts set forth in and falling within the scope of the appended claims.

In the drawings: Fig. 3 is a top plan view. Fig. 12 is a detail sectional view taken on the line 12—12 of Fig. 3.

Figures 1, 8, 14:
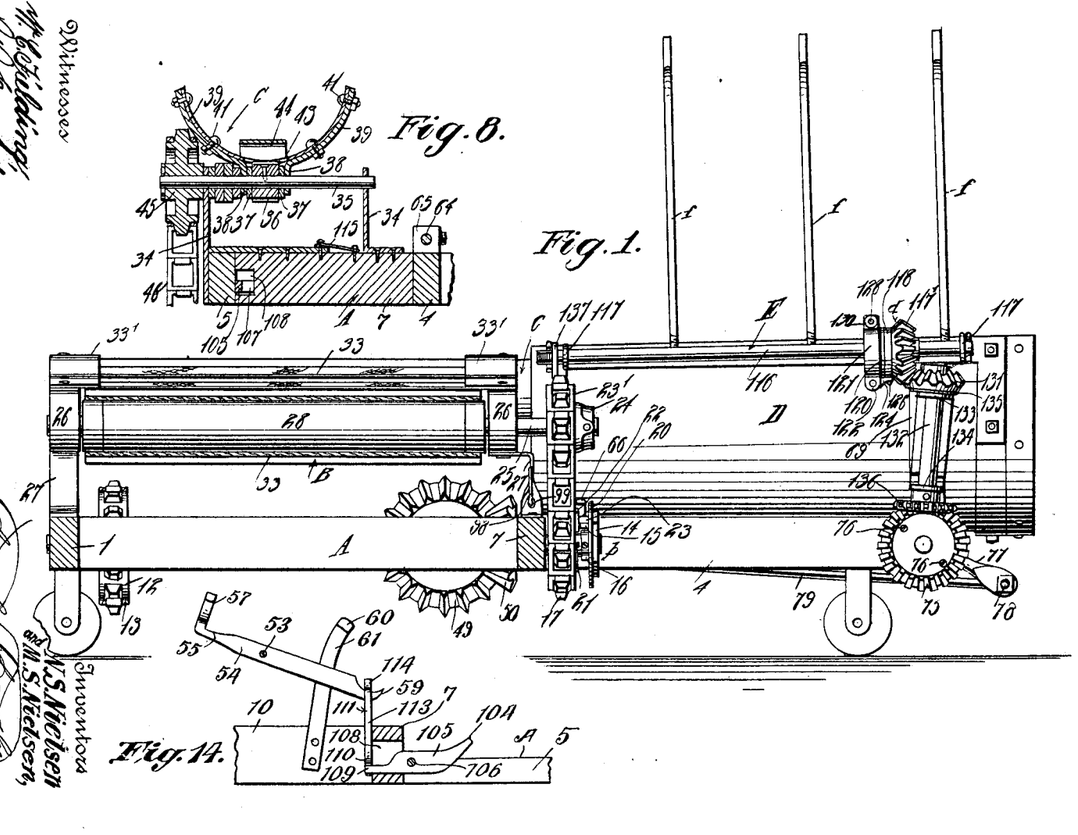
Figure 1 is a view in elevation looking at that side of the machine which is attached to the binder.
Fig. 8 is a vertical cross sectional view taken on the line 8—8 of Fig. 3.
Fig. 14 is a detail view showing the tilting lever 54, the tripping arm 61, the trip lever 105 and the bell crank latch 111, the view also showing a portion of the frame of the machine.
Figures 2, 9:
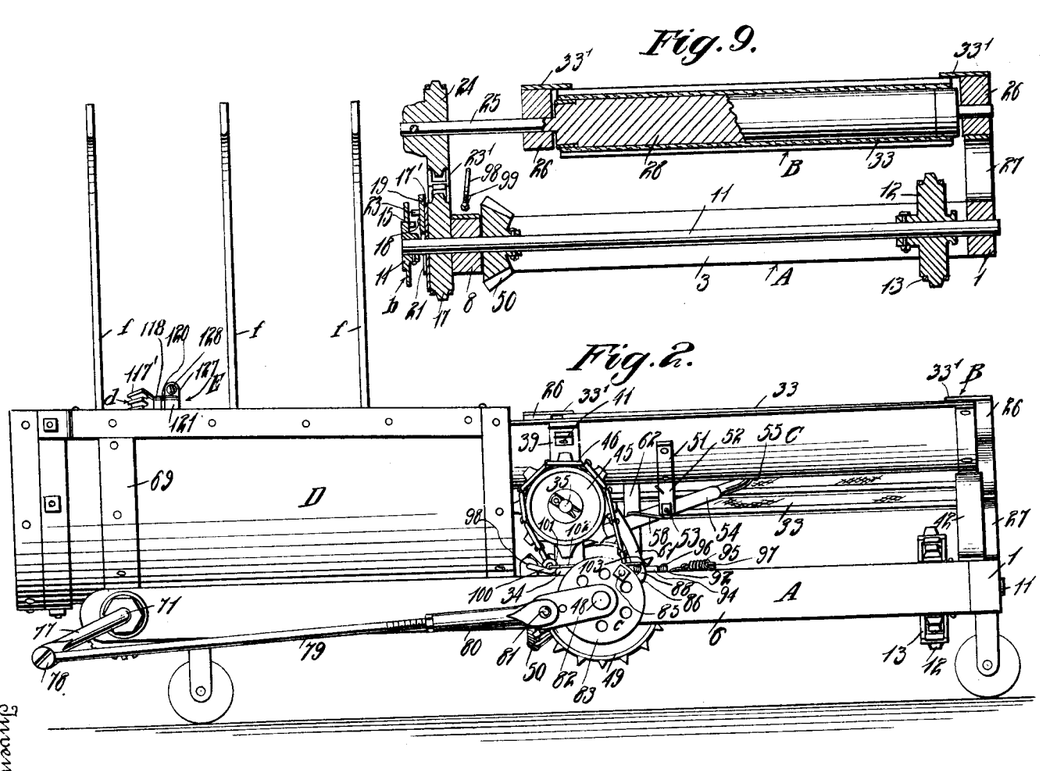
Fig. 2 is a similar view of the opposite side of the shocker.
Fig. 9 is a vertical longitudinal sectional view taken through the power shaft of my machine on the line 9—9 of Fig. 3.
Figures 4, 6, 13:
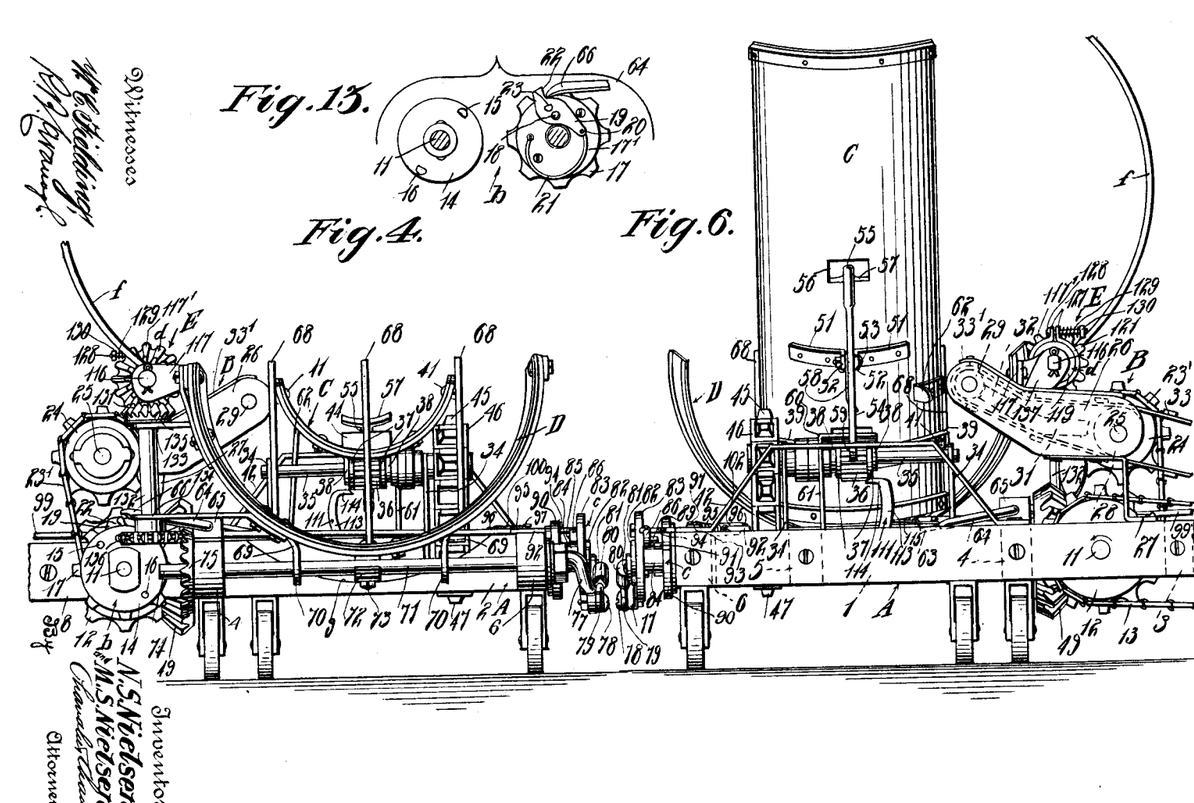
Fig. 4 is a view in rear elevation looking at the delivery end of the cradle of the machine.
Fig. 6 is a view in front elevation, showing the bundle carrier in tilted position to deposit the bundle in the shock cradle.
Fig. 13 shows in detail the confronting faces of the members of the clutch $b$.
Figure 5:
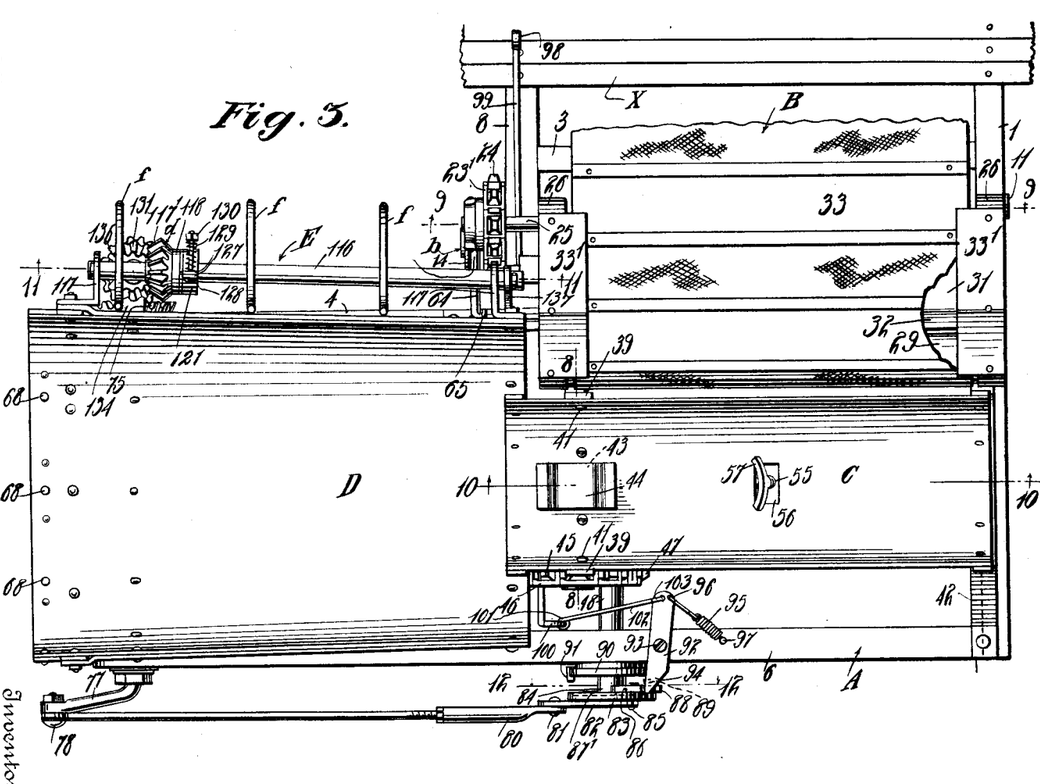
Fig. 5 is a view in elevation similar to Fig. 2, but showing the shock cradle in its dumping position.
Figures 5, 10, 14:
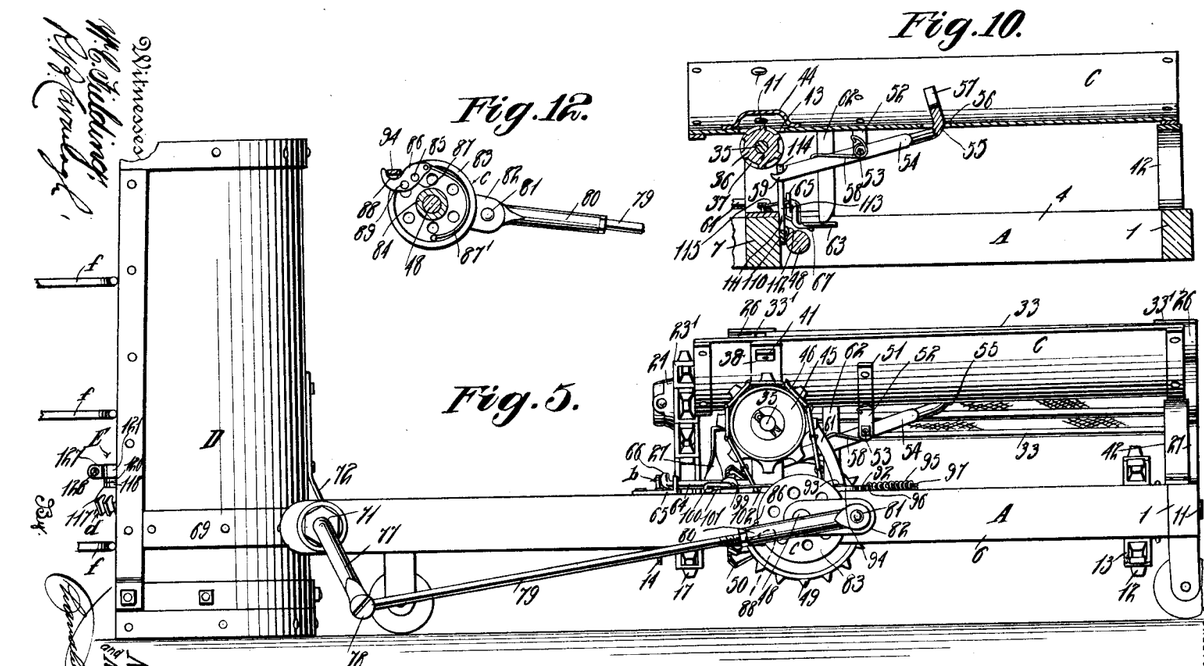
Fig. 10 is a central vertical longitudinal sectional view taken on the line 10—10 of Fig. 3.
Figures 7, 11:
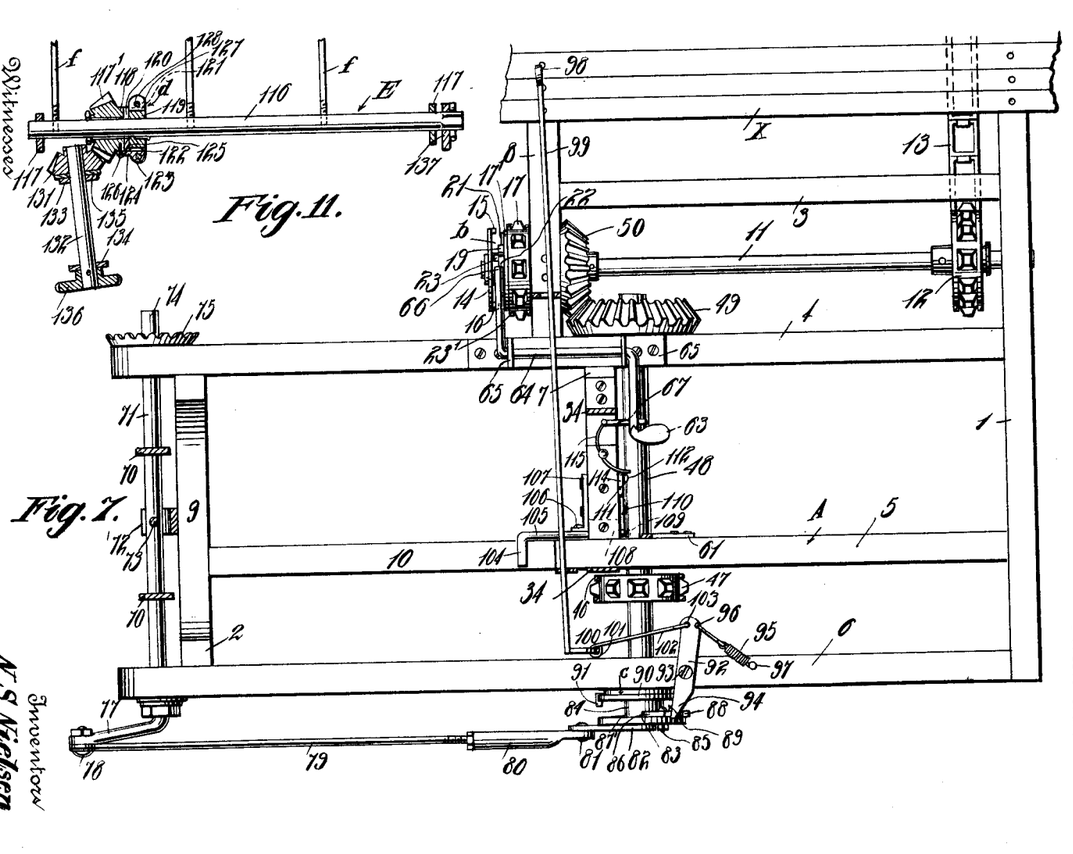
Fig. 7 is a top plan view with the conveyer, the bundle carrier and the shock cradle removed.
Fig. 11 is a longitudinal sectional view taken through the operating shaft of the shock retainer of the cradle on the line 11—11 of Fig. 3.

In the present instance our invention embraces, among other features, a wheeled frame adapted to be attached beneath the deck of a binder and to project beyond the same, said frame carrying an inclined endless apron or conveyer which receives the bundles from the binder and carries the same to a bundle carrier in the form of an open receptacle which is designed to be tilted at predetermined times to throw or toss the bundle into a shock cradle located adjacent thereto, the shock cradle in turn being adapted to be tilted or upset to deposit the shock upon the ground, this shock cradle being provided with a shock retainer for preventing the premature discharge of the shock from the cradle.

Referring now to the accompanying drawings in detail, the letter A indicates the frame of my machine as an entirety, while the conveyer is shown at B, the bundle carrier at C, the shock cradle at D and the shock retainer at E.

The frame, which may be of any preferred form, in the present instance is composed of end bars 1 and 2, the longitudinal bars 3, 4, 5 and 6 and the cross bars 7 and 8. The cross bar 2 is concaved as at 9, while the longitudinal bar 5 is cut away and reduced as at 10 from a point adjacent the cross bar 7 to its point of junction with the concaved end bar 2 so that the cradle will be properly received and supported by the frame. The machine is attached at its cross bar 3 in any suitable manner beneath the deck of the binder, a portion of the deck being conventionally illustrated at X in Fig. 3.

Journaled in the end bar 1 and the cross bar 8 is a power shaft 11 to which is keyed the drive sprocket 12, adapted to be driven by a chain 13, a portion only of which is shown, said chain receiving power from the binder. One end portion of this shaft projects through and beyond the cross bar 8 and carries the sprocket clutch $b$, one member of which is the disk 14 fast on the end of the shaft and provided with the inwardly projecting studs 15—16, while the other member of the clutch includes the sprocket 17 loose on the shaft and having fastened to its outer face the disk 17' which has pivoted thereto at 18 the flat pawl 19, the inner end of which is shouldered as at 20 and is normally thrown against and stopped by the shaft when influenced by the spring 21, the outer end of the pawl being notched as at 22. This pawl carries an inwardly extending stud 23, which when the pawl is thrown outward by the spring 21 is designed to be contacted with by one of the studs 15—16 of the disk 14 so that the two parts of the clutch are connected and the sprocket will turn with the power shaft 11. When, however, the notched portion of the pawl is contacted with by the head 66 of the rocking trip arm 64, as hereinafter described, the pawl will be pushed inward against the tension of the spring 21 the inner shouldered end 20 of the pawl being thrown outward away from the shaft and the disk 14 will turn with the shaft without either of the studs 15—16 thereof contacting with the stud on the pawl so that the two parts of the clutch will be disconnected. The sprocket 17 of the clutch when in driving engagement with the shaft 11 drives the endless chain 23' which trains over and drives the sprocket 24, thus imparting motion to the drive shaft 25 of the inclined endless conveyer B. This conveyer comprises the angular end bars 26, supported by brackets 27 secured to the frame. The shaft 25 is journaled in the lower ends of the bars 26 and carries a roller 28. In the upper ends of the end bars is journaled another roller 29, while the deck of the conveyer is formed by a horizontal planking 31 and the inclined planking 32 extending between the end bars. Over the rollers 28 and 29 is adapted to travel the endless apron 33 of the conveyer, this apron being preferably formed of canvas, carrying spaced wooden slats, although it may be made of any suitable material.

To the top of each end bar of the conveyer frame, we fasten inwardly extending strips or plates 33' which overlie the adjacent edges of the traveling apron and assist in guiding the apron and maintaining the same in its proper position.

The construction and operation of the bundle carrier and its allied connections or operating parts are as follows:

Fixed upon the cross bar 7 of the frame are the spaced vertically disposed brackets 34 carrying a shaft 35, having fast therewith a ratchet pinion 36 which is located at approximately the center of the shaft. Loosely mounted on the shaft at each side of this ratchet pinion, but held spaced apart therefrom by a washer 37 is an arm 38, the upper portion of which is curved as at 39, so that it will be seen by reference to the drawings, the two curved sections of the arms extend in opposite directions and are fastened to and form a support for the bundle carrier C. This bundle carrier is in the present instance in the form of a semi-cylindrical receptacle made of metal or other suitable material and fastened adjacent one end to the curved arm sections 39 by means of bolts 41. The opposite end of the bundle carrier is adapted, when the latter is in bundle-receiving position, to rest upon the supporting bracket 42 fastened to the end bar 1 of the frame. The bundle carrier is slotted as at 43 so as not to interfere with the operation of the ratchet pinion 36, and this slot is covered by a guard plate 44.

To drive the shaft 35 we provide one end of the latter with a sprocket wheel 45 fast therewith and driven by the endless chain 46 trained over the sprocket wheel 47, carried by the counter shaft 48 journaled transversely in the longitudinal bars 4, 5 and 6 of the frame. One end of this counter shaft 48 projects beyond the frame bar 4 and has fast therewith a bevel gear 49 meshing with a similar bevel gear 50 on the power shaft 11 of the machine. It will thus be seen that motion is transmitted through the gears 50 and 49 to the counter shaft 48, thence through the sprocket 47, the chain 46 and the sprocket wheel 45 to the shaft 35. Fastened to the under side of the bundle carrier are the arms 51 terminating in vertical parallel extensions 52, between which is pivoted as at 53 the tilting lever 54. This lever is pivoted approximately centrally of its length and one end thereof is bent at an angle as at 55 to extend through a slot 56 in the bundle carrier, the end of said angular portion lying within the confines of the carrier and terminating in the head 57. A spring 58 bears against the lever in such manner as to normally tend to elevate the head of the lever and consequently depress the opposite end thereof. The opposite end of the lever terminates in a pawl end 59.

When the lever is depressed by the bundle falling into the carrier striking the head 57 the pawl end 59 is moved into engagement with the ratchet pinion 36 and the rotation of the latter under the action of its shaft will tilt the carrier upward to throw the bundle into the shock cradle. When the bundle carrier has reached the limit of its vertical or tilting movement the pawl end of the tilting lever 54 strikes against the lateral end 60 of the tripping arm 61 which is fastened to the bar 5 of the frame and the lever is thrown out of engagement with the ratchet pinion and back to its normal position, assisted by the action of its spring 58 so that the carrier drops back to its horizontal bundle-receiving position.

When the carrier is in its horizontal bundle-receiving position, the depending arm 62 thereof presses against the flattened end 63 of the angular rocking trip arm 64 which is mounted to rock in the brackets 65—65 carried by the bar 4 of the frame, and holds the opposite end or the trip head 66 of such arm 64 above or out of the path of rotation of the sprocket clutch $b$ and its pivoted dog 19. When, however, the bundle carrier is being tilted or elevated it carries the depending arm 62 with it so that the pressure on the rocking trip arm 64 is relieved and the flattened end thereof is elevated by the leaf spring 67 bolted to the cross bar 7. Thus the opposite end or trip head 66 of the rocking trip arm 64 is depressed so that in the revolution of the sprocket clutch $b$ the dog 19 contacts with or catches on the trip head 66 and is swung inward or depressed against the action of its spring 21. This causes the stud 23 of the pawl or dog 19 to move out of contact with the coöperating stud of the clutch disk 14 and the sprocket 17 is disconnected from driving engagement with the power shaft 11 so that the endless apron of the conveyer ceases to travel as heretofore mentioned.

The shock forming cradle D is in the form of an approximately semi-frusto-conical receptacle, that is to say, is of greater cross dimensions at its outer or delivery end than at its inner end. This cradle is formed of any suitable material, such as metal, or a combination of metal and wood and is provided at its delivery end with a series of spaced retaining rods 68 which extend vertically when the cradle is in its horizontal position and assist in retaining the bundles forming the shock until the cradle is completely tilted or dumped. Fastened in supporting engagement with the under side of the cradle adjacent the delivery end thereof, are the curved arms 69 having the lower ends thereof extended approximately in parallelism and bored as at 70 to permit the passage therethrough of the cradle shaft 71. A bracket arm 72 is also fastened to the bottom of the cradle and embraces the shaft at approximately the center thereof, while a bolt 73 passes through the cradle, the shaft and the bracket arm securing all three together, so that the cradle is connected with the shaft and will be tilted thereby as hereinafter described. This cradle shaft 71 is journaled at its ends in the ends of the longitudinal bars 4 and 6 of the frame, the end 74 of the shaft projecting beyond the bar 4 and passes through a gear wheel 75 which is made fast by screws 76 to the bar 4. The opposite end of the shaft 71 is bent at an angle to form a crank 77 having connected thereto by the bolt 78 one end of the connecting rod 79, the opposite end of said rod carrying a sleeve 80 which is pivotally connected at 81 to the arm 82 rigidly fastened to the disk 83. This disk is provided with a collar 84 by which it is loosely mounted upon the end of the counter shaft 48, such disk forming one member of the two-part clutch, which is indicated as a whole by the letter $c$, by means of which the operating mechanism for tilting the cradle is placed in and out of connection with the counter shaft. This disk 83 has pivoted at 85 to its inner face the dog 86, the end 87 of which is shouldered to normally bear against the collar 84, a spring 87′ normally throwing the shouldered end of the dog against the collar, the outer end of the dog, which projects beyond the periphery of the disk being notched as at 88. This dog also carries a projecting stud 89. Fast with the counter shaft 48 is the second member of the clutch which includes a disk 90 carrying the inwardly extending studs 91 disposed at opposite sides of the periphery of the disks. When the dog is thrown into its normal outer position by the spring, one of these studs 91 of the disk 90 is adapted to contact with the stud of the pivoted dog and thereby connect the loose disk in driven engagement with the counter shaft so that motion will be imparted to the operating mechanism for tilting the cradle. However, when the conveyer B is in motion or the bundle carrier C is being tilted, it is required that the shock cradle remain at rest in its normal horizontal position and consequently the two members of the clutch C must be thrown and held out of driving connection so that no motion will be imparted to the operating mechanism of the cradle. This purpose is accomplished by means of a tripping plate 92 which is pivoted as at 93 to the cross bar 6 of the frame so that the end 94 of said tripping plate normally bears against the periphery of the loose disk of the clutch, this being caused by the spring 95, one end of which is connected at 96 to the inner end of the tripping plate and the outer end of which is connected by a stud as at 97 to the bar 6 of the frame. Thus the tripping plate is normally pulled and held by the spring in its tripping position so that should the two disks be connected or in driving engagement, as the loose disk with its dog reaches this trip the notched end of the dog will strike beneath the trip and move inward so that the stud of this dog will be shifted out of contact or engagement with the corresponding stud of the disk fast on the counter shaft, thereby disengaging the loose disk from the fast disk. Thus while the counter shaft is free to turn the loose disk will be held by the tripping plate and the operating mechanism of the cradle will be thrown out of operation.

When the cradle has been loaded with a sufficient number of bundles to form a shock and it is desired to tilt or dump such cradle, the operator on the deck of the binder depresses the foot pedal 98 at the end of the rocking rod 99 which extends transversely of the frame and has its end opposite the foot lever bent laterally as at 100 and connected at 101 with the link bar 102 which in turn is connected at 103 with the tripping plate. By depressing the foot pedal it will be seen that this rod 99 is rocked so that the tripping plate is moved outward and away from the clutch a sufficient distance so that the dog of the loose member of the clutch may spring outward to its normal engaging position under the influence of its spring and thereby allow the stud on the dog to contact with or engage the studs of the disk fast on the counter shaft to place these disks in connection so that power may be transmitted from the counter shaft through the connected disks to the connecting rod and thence to the cradle shaft to operate the latter.

When the shock cradle is moving or tilting it is desirable that the bundle carrier be prevented from also tilting or moving, or in other words, be maintained in its horizontal position and conversely when the shock cradle is at rest in its horizontal position it is intended that the bundle carrier should be free to tilt to throw or toss its bundle into the shock cradle. This is accomplished as follows: In its normal horizontal position the cradle rests on and is supported by the concave portion 9 of the end bar 2 and the reduced or cut away section 10 of the longitudinal bar 5. The inner end of the cradle bears upon and depresses the head 104 of the trip lever 105 which is mounted upon the pivot 106 supported in the bracket 107 and the adjacent portion of the longitudinal bar 5 of the frame, the opposite portion of the lever projecting through the slot 108 cut in the cross bar 7 and has its end 109 extending beneath the horizontally disposed arm 110 of the bell crank latch 111 which is pivoted at 112 to the cross bar 7 and is provided at the free end of its vertical arm 113 with a lateral hook 114. A spring finger 115 is mounted on top of the cross bar 7 and bears against the vertical portion of this latch and normally tends to throw the hook of the latter directly beneath the ratchet pinion 36 and in the path of the pawl end 59 of the tilting lever 54, so that should such pawl end of the tilting lever be moved upward while the hook latch is lying in the path of the same, as just described, such pawl end will strike the hook of the latch and be prevented from engaging with the ratchet pinion 36 and thereby the tilting of the bundle carrier will be prevented. When the shock cradle bears upon the head 104 of the lever 105, however, it depresses the head and forces the opposite end thereof upward against the adjacent end of the arm of the bell crank latch and elevating such horizontal arm moves the latch backward against the action of the spring finger 115 and out of the path of the pawl end of the tilting lever 54, so that should the lever 54 be now operated by the weight of the bundle thereon the pawl end 59 may move into engagement with its operating ratchet to tilt the carrier.

Upon the weight of the cradle being released from the lever 105, as in the upward movement or tilting of the cradle the hook latch will, of course, spring across the path of the pawl end of the lever 54 and prevent the engagement of the same with the ratchet pawl as heretofore stated.

The guard for retaining the shock within the cradle and for preventing the accidental falling of such shock while the cradle is being tilted includes the shaft 116 mounted to turn in the brackets 117—117 located at opposite ends of the cradle adjacent the upper edge thereof so that the shaft extends parallel with one side of the cradle. This shaft carries a series of curved rods or retaining fingers f, which when in their retaining position are adapted to extend across the cradle from side to side and overlie the shock thereon. This shaft 116 also carries a gear clutch d, comprising a bevel gear 117' loosely mounted on the shaft and formed with a collar 118. The disk 119 is attached to the shaft, while a split washer or ring 120 is interposed between the collar of the gear and the disk. A pair of curved spring bands 121 embrace the periphery of the disk and at their parallel ends 122 are connected with each other and with the end 123 of the connecting plate 124 having a threaded bore 125 through which passes a screw 126 connecting the plate with the collar of the loose gear. The opposite parallel ends 127 of the spring bands are adjustably connected by the screw 128 which is provided with a tension spring 129 for regulating the operating tension of the bands, this being accomplished by the nut 130 on the shank of the screw. Meshing with the loose bevel gear 117 is a similar bevel gear 131 carried at the upper end of the vertical shaft 132, said shaft turning in the upper and lower brackets 133 and 134 which are fastened to and extend from the adjacent side of the cradle. A washer 135 is placed between the upper bracket 133 and the gear 131. The lower end of the shaft 132 carries the gear wheel 136 which meshes with and travels around the stationary gear 75 fast at the adjacent side of the longitudinal bar 4. In operation when the cradle is at rest or in its horizontal position the retaining bars or fingers are elevated so that the bundles may be thrown into the cradle. As the cradle is operated and starts to tilt its movement toward a vertical position causes the gear wheel 136 to travel around the stationary gear and thus turn the vertical shaft 132. Thus the gear at the upper end thereof meshing with the loose bevel gear of the clutch $d$ causes motion to be imparted to the curved clutch bands and the latter exert a binding action upon the disk fast with the shaft thus throwing the arms outward into a position transversely of the shock cradle thereby holding the shock. As the cradle reaches its final dumping or vertical position the weight of the shock falling therefrom throws the arms outward and the action of the clutch binding on the shaft carrying the retaining arms is relieved. The shock then leaves the cradle at the delivery end of such cradle as the machine moves along. As the cradle moves back to its horizontal position the clutch will again be brought into action so that the retaining arms with their shaft will again reach an open position when the cradle is at rest.

The turning of the shaft carrying the retaining arms is limited by the eccentric stop 137 at the inner end of this shaft, for as the arms are swung outward, this eccentric stop or arm will strike against the adjacent portion of the cradle when the arms have reached their vertical position and prevent their going back any farther.

From the above description taken in connection with the accompanying drawings, the construction and operation of our invention will be readily understood.

As before stated the shocking attachment is connected with the binder and it is provided with a suitable number of wheels or casters $w$. As the binder moves over the field the bundles are taken from the binder into the conveyer B, and, through the train of gearing heretofore described, the conveyer is driven to transfer the bundles to the bundle carrier C. As the bundle reaches the bundle carrier the weight of the same depresses the head of the tilting lever 54 and throws the pawl end of the lever into engagement with the ratchet pinion 36, the latch for the pinion being thrown and held out of the way as heretofore mentioned by the weight of the cradle depressing the lever 105. The pinion 36 co-acting with the engaging tilting-lever starts the bundle carrier on its vertical movement and as the depending arm 62 leaves the flattened end 63 of the angular rocking trip arm 64 the latter is brought into engagement with the clutch $b$ to throw the conveyer out of operation. When the bundle carrier has reached the limit of its upward movement it tosses the bundle into the cradle, and then drops back by gravity into normal bundle receiving position. Of course, as it reaches its normal, horizontal bundle-receiving position, depending arm 62 again contacts with the flattened end of the angular rocking trip arm 64 so that the latter is moved away from the clutch at the end of the power shaft 11 and the conveyer is again thrown into action. When the shock cradle is filled with a sufficient number of bundles to form a shock the operator depresses the foot pedal 98 which throws out the tripping plate away from the clutch $c$ and permits such clutch to be thrown into operation to bring the connecting rod in driven engagement with the counter shaft so that the cradle will be tilted to deposit the shock on the ground as heretofore described in detail.

From the foregoing it will be noted that we have provided a simple, yet efficient machine whereby the bundles, as they come from the binder will be automatically formed into shocks and deposited upon the ground. Thus the shocking may be accomplished rapidly and at a considerable saving of time, expense and labor.

While we have herein shown and described one particular embodiment of our invention, we wish it to be understood that we do not limit ourselves to all the precise details of construction herein set forth by way of illustration, as modification and variation may be made without departing from the spirit of the invention or exceeding the scope of the appended claims.

What we claim is:

1. The combination with a traveling conveyer, a movable bundle carrier adapted to receive the bundles from the conveyer and a movable shock former adapted to receive the bundles from the bundle carrier, of means for driving the conveyer, means for actuating the bundle carrier to deliver the bundles to the shock former, means for operating the shock former to deposit the shock upon the ground, a device operated by the movement of the bundle carrier for throwing the conveyer out of operation, and mechanism operated by the movement of the shock former for preventing the movement of the bundle carrier.

2. The combination with a traveling conveyer, of a tilting bundle carrier arranged adjacent the conveyer and adapted to receive bundles therefrom, a tilting shock former arranged adjacent the bundle carrier 5 and adapted to receive the bundles therefrom and form a shock, mechanism for driving the conveyer, means for tilting the bundle carrier, devices actuated by the tilting of the bundle carrier for throwing the conveyer 10 driving means out of operation, means for tilting the shock former and a device actuated upon the tilting of the shock former adapted to prevent the operation of the bundle carrier tilting means.

In testimony whereof, we affix our signatures, in the presence of two witnesses.

NELS S. NIELSEN.
MAGNER S. NIELSEN.

Witnesses:
VAL JENSEN,
G. L. GODFREY.

Copies of this patent may be obtained for five cents each, by addressing the "Commissioner of Patents, Washington, D. C."